(12) United States Patent
Donescu et al.

(10) Patent No.: US 9,698,593 B2
(45) Date of Patent: Jul. 4, 2017

(54) METHODS AND SYSTEMS FOR REDUCING THE IMPACT OF A GENERATOR SHORT CIRCUIT IN A WIND TURBINE

(71) Applicant: VESTAS WIND SYSTEMS A/S, Aarhus N (DK)

(72) Inventors: Victor Donescu, Westford, MA (US); Lars Helle, Suldrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 98 days.

(21) Appl. No.: 14/442,311

(22) PCT Filed: Nov. 13, 2013

(86) PCT No.: PCT/DK2013/050374
§ 371 (c)(1),
(2) Date: May 12, 2015

(87) PCT Pub. No.: WO2014/079453
PCT Pub. Date: May 30, 2014

(65) Prior Publication Data
US 2016/0204601 A1    Jul. 14, 2016

Related U.S. Application Data

(60) Provisional application No. 61/728,275, filed on Nov. 20, 2012.

(51) Int. Cl.
*H02H 7/00*    (2006.01)
*H02H 9/04*    (2006.01)
(Continued)

(52) U.S. Cl.
CPC ........... *H02H 9/045* (2013.01); *F03D 7/0272* (2013.01); *F03D 9/25* (2016.05); *F03D 17/00* (2016.05);
(Continued)

(58) Field of Classification Search
CPC ............ H02H 7/06; H02H 9/045; H02H 9/02; H02H 9/041; H02P 29/0241; F03D 9/25;
(Continued)

(56) References Cited

U.S. PATENT DOCUMENTS 7,276,807 B2 * 10/2007 Luetze ................... H02H 7/067
290/44
7,786,608 B2 * 8/2010 Menke .................. F03D 7/0248
290/44

(Continued)

FOREIGN PATENT DOCUMENTS

| CN | 101009475 A | 8/2007 |
|---|---|---|
| EP | 1819023 A2 | 8/2007 |
| EP | 2372860 A1 | 10/2011 |

OTHER PUBLICATIONS

International Search Report for PCT/DK2013/050374, Aug. 29, 2014.

*Primary Examiner* — Rita Leykin
(74) *Attorney, Agent, or Firm* — Patterson + Sheridan, LLP

(57) ABSTRACT

A method is provided for reducing an impact of an unbalanced short circuit event that occurs in a polyphase permanent magnet generator of a wind turbine. According to the method, an unbalanced short circuit event is detected in the generator of the wind turbine, and, in response to detecting the unbalanced short circuit event, at least one phase of the generator is shorted at a switch-point between the generator and a converter of the wind turbine to create a balanced short circuit in the generator. By doing so, the torque response of the generator is altered to avoid high amplitude torque oscillations that would otherwise occur as a result of the unbalanced short circuit event.

8 Claims, 13 Drawing Sheets

(51) Int. Cl.
*H02H 9/02* (2006.01)
*F03D 7/02* (2006.01)
*F03D 17/00* (2016.01)
*H02P 29/024* (2016.01)
*F03D 9/25* (2016.01)

(52) U.S. Cl.
CPC .............. *H02H 9/02* (2013.01); *H02H 9/041* (2013.01); *H02P 29/0241* (2016.02); *F05B 2270/328* (2013.01); *F05B 2270/80* (2013.01); *Y02E 10/723* (2013.01); *Y02E 10/725* (2013.01)

(58) Field of Classification Search
CPC .. F03D 17/00; F03D 7/0272; F05B 2270/328; F05B 2270/80
USPC ... 361/20, 5, 6, 18, 23, 21, 30, 31, 66, 91.8, 361/93.1; 322/35, 91; 290/52, 44; 318/153
IPC .................................................. H02P 29/0241
See application file for complete search history.

(56) References Cited

U.S. PATENT DOCUMENTS

| | | | | |
|---|---|---|---|---|
| 8,129,851 B2* | 3/2012 | Ichinose | ................ | F03D 9/003 290/44 |
| 8,378,515 B2* | 2/2013 | Fortmann | ............... | F03D 9/003 290/44 |
| 8,436,490 B2* | 5/2013 | Gertmar | ................ | H02J 3/1842 307/100 |
| 8,674,665 B2* | 3/2014 | Sheng | .................... | H02P 9/007 290/44 |
| 8,896,261 B2* | 11/2014 | Bando | .................... | H02P 9/007 290/44 |
| 9,548,605 B2* | 1/2017 | Lewis | ..................... | H02P 29/02 |
| 9,548,685 B2* | 1/2017 | Hasegawa | ........... | H02P 29/0241 |
| 9,564,750 B2* | 2/2017 | Hiller | ................. | H02P 29/0241 |
| 2011/0320052 A1* | 12/2011 | Yasugi | ..................... | H02J 3/16 700/287 |
| 2013/0194704 A1* | 8/2013 | Lewis | ..................... | H02H 7/06 361/20 |

\* cited by examiner

METHODS AND SYSTEMS FOR REDUCING THE IMPACT OF A GENERATOR SHORT CIRCUIT IN A WIND TURBINE

FIELD OF THE INVENTION

The present invention relates generally to methods and systems for reducing the impact of a generator short circuit or arc in a wind turbine generator (WTG) (also referred to herein as "wind turbine"), and in particular to methods and systems for reducing damage due to transient torque oscillations of the generator after a short circuit occurs in the generator.

BACKGROUND OF THE INVENTION

Use of a permanent magnet synchronous generator in the power train of a wind turbine has some advantages compared to other types of generators more commonly used on wind turbines. These advantages include, among other things, high efficiency, lower losses on the rotor of the generator (which is a difficult part to cool down), lack of any slip-rings and their attendant problems, and better low voltage ride through performance.

However, when a short circuit event, such as an arc, occurs in the generator or converter during normal operation, a permanent magnet synchronous generator will continue to generate stator voltage as long as the generator is turning since the permanent magnets in the rotor will continue to produce a magnetic field. Therefore, short circuit current is produced under such conditions and must be properly handled to avoid damage to the wind turbine.

Different types of short circuit events can occur and may be handled in different ways to reduce impact on the wind turbine. For instance, in a polyphase generator and power converter configuration, a power converter failure will in most cases appear as a three-phase short circuit on the generator. A three-phase short circuit on the generator causes a transient torque oscillation followed by an almost complete unloading of the drive train. Such an unloading causes undesirable mechanical load levels on the wind turbine. To reduce the impact from such a short circuit event, the wind turbine may have means to disconnect the converter from the generator and for subsequently applying a passive dump load, which will serve to reintroduce a certain load torque on the drive train.

Another short circuit event, which appears somewhat rarely, is a three-phase short circuit inside a three-phase generator. This kind of short circuit event also causes a transient torque oscillation followed by an almost complete unloading of the drive train. From an electrical point of view, no measures, such as application of a passive dump load, can be taken to counteract this undesired unloading of the drive train.

A third type of short circuit event is an unbalanced short circuit in the generator of a wind turbine. When, for example, a two-phase short circuit (which is a type of unbalanced short circuit) occurs in the generator, a transient torque oscillation appears followed by a stationary torque oscillation with a frequency content determined by the speed of the generator. One countermeasure that can be taken in response to an unbalanced short circuit in the generator is to shut down the wind turbine (i.e., bring the wind turbine to a standstill). However, as shown, for example, in FIGS. 8, 9, and 10, the drive train oscillation would go through a very large frequency range resulting in a high risk of exciting resonances in the drive train and turbine foundation. Moreover, as with the three-phase short circuit event, application of a dump load would have no substantial effect on the torque oscillations.

FIG. 7 shows a controlled speed ramp down of the generator in a wind turbine when it is shut down due to a two-phase short circuit in a generator winding. FIG. 8 shows a graph of an example torque response of the generator associated with the speed ramp down profile in FIG. 7, but without application of the dump load. The graph includes two curves, a first one calculated by a dynamic model, and a second one calculated by a simple analytical approach. FIGS. 9 and 10 show different zoomed in views of the graph in FIG. 8. As shown in FIGS. 9 and 10, the torque oscillation contains a wide range of harmonics.

FIG. 11 shows a graph of an example torque response of the generator associated with the speed ramp down profile shown in FIG. 1, but in this graph the dump load has been applied. FIGS. 12 and 13 show different zoomed in views of the graph in FIG. 11. As shown in FIGS. 12 and 13, the torque oscillations contain a wide range of harmonics regardless of the fact that a dump load has been applied. Thus, the torque oscillations due to a two-phase short circuit are just as severe as without the dump load.

"IPM Synchronous Machine Drive Response to Symmetrical and Asymmetrical Short Circuit Faults" by Welchko et al. (IEEE Transactions on Energy Conversion, Vol. 18, No. 2, June 2003) describes long-lasting, high amplitude torque oscillations applied to an interior permanent magnet (IPM) synchronous machine due to failure of an inverter switch of an adjustable-speed drive that supplies current to the IPM machine. The failure of the inverter switch results in an asymmetrical short circuit at the terminals of the IPM machine. Welchko et al. propose closing additional switches in the adjustable-speed drive to create a balanced short circuit fault, which reduces the potentially damaging levels of torque oscillations. However, this approach has the drawback of introducing high levels of current into components of the adjustable-speed drive that may not be rated for high currents. The same problem occurs when the IPM machine is used as a generator rather than a motor and a converter is used instead of the adjustable-speed drive.

A short circuit or short circuit event is frequently referred to herein as occurring "in" a generator. However, the location of an unintended electrically conductive connection (e.g., an arc) that causes a short circuit to occur in the generator may be external to a housing of the generator. For example, an unintended electrical connection may occur at any number of places external to the generator housing (e.g., between cables carrying power produced by the generator to a converter, between electrical conductors within the converter, between conductors in a complex cable termination or in a device, such as a circuit breaker or voltage protection device) but can have substantially the same short circuit effect as an unintended electrical connection that occurs internal to the generator housing. Thus, an unintended electrical connection that occurs either inside or outside of the generator housing creates a short circuit in the generator if one or more conductive elements in the generator are in an electrically conductive circuit (i.e., a short circuit) that includes the unintended electrical connection.

SUMMARY OF THE INVENTION

According to a first aspect, the invention provides a method of reducing an impact of an unbalanced short circuit event that occurs in a polyphase permanent magnet generator of a wind turbine. According to the method, an unbalanced short circuit event is detected in the generator of the wind turbine, and, in response to detecting the unbalanced short circuit event, at least one phase of the generator is shorted at a switch-point between the generator and a converter of the wind turbine to create a balanced short circuit in the generator. By doing so, the torque response of the generator is advantageously altered to avoid high amplitude torque oscillations that would otherwise occur as a result of the unbalanced short circuit event.

In another embodiment of the method according to the first aspect of the invention, the detected unbalanced short circuit event is at least one of a two-phase short circuit event, a single-phase-to-ground short circuit event, and a multiple-phase-to-ground short circuit event.

In another embodiment of the method according to the first aspect of the invention, the method includes additional stages. For example, a voltage fault is first detected. Next, a dump load is coupled to an output of the generator in response to detecting the voltage fault. According to this embodiment, detecting the unbalanced short circuit includes determining that the detected voltage fault is caused by the unbalanced short circuit event in the generator. In addition, shorting the at least one phase of the generator includes shorting the dump load.

In another embodiment of the method according to the first aspect of the invention, shorting the at least one phase of the generator includes shorting a circuit path at the switch-point between the at least one phase and at least one other phase.

According to a second aspect the invention provides a wind turbine with unbalanced short circuit protection. The wind turbine includes a rotor including one or more blades that cause the rotor to rotate in response to wind forces and a polyphase permanent magnet generator that receives a torque input from the rotor and produces multi-phase electric power. The wind turbine according to the second aspect of the invention also includes a converter configured to receive the electric power produced by the generator and to convert the electric power for use in a power grid. A short circuiting switch is arranged between the generator and the converter and configured to create a balanced short circuit in the generator when enabled. The wind turbine additionally includes one or more sensors that provide information indicative of an unbalanced short circuit event and a controller that receives data from the one or more sensors to detect the unbalanced short circuit event in the generator of the wind turbine. The controller also causes the short circuiting switch to create a balanced short circuit in the generator in response to detecting the unbalanced short circuit event. Accordingly, the torque response of the generator is advantageously altered to avoid high amplitude torque oscillations that would otherwise occur as a result of the unbalanced short circuit event.

In another embodiment of the method according to the second aspect of the invention, the detected unbalanced short circuit event is at least one of a two-phase short circuit event, a single-phase-to-ground short circuit event, and a multiple-phase-to-ground short circuit event.

In another embodiment of the method according to the second aspect of the invention, the wind turbine further includes a dump load configured to be selectively coupled to the generator to consume the electricity produced by the generator when a fault occurs. Moreover, the controller is further configured to detect a voltage fault and couple the dump load to the generator in response to detecting the voltage fault and determine that the detected voltage fault is caused by the unbalanced short circuit event. The balanced short circuit created by the short circuiting switch may cause a short across the dump load.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Example methods and systems described herein can be used in a wind turbine to reduce the undesirable torque oscillations created by unbalanced short circuits or arcs in a generator of the wind turbine. According to one embodiment, a three-phase circuit breaker is implemented in a grid-side converter of the wind turbine and, when an unbalanced short circuit is detected, the three-phase circuit breaker switches on to emulate a balanced three-phase short circuit.

Figure 1:
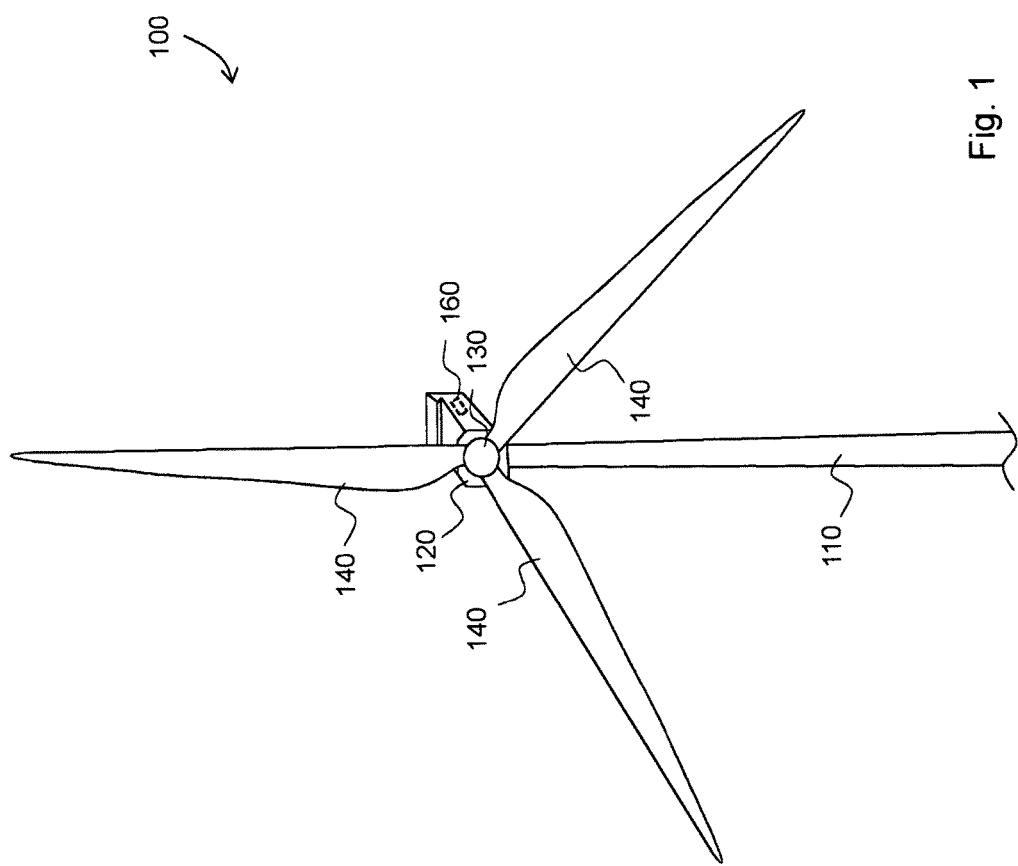
FIG. 1 shows a general structure of a wind turbine.

FIG. 1 illustrates an example wind turbine generator (WTG) (also referred to herein as "wind turbine") 100 according to an embodiment. As illustrated in FIG. 1, the WTG 100 includes a tower 110, a nacelle 120, and a rotor 130. In one embodiment, the WTG 100 may be an onshore wind turbine. However, embodiments of the invention are not limited only to onshore wind turbine. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the WTG 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 132 may further comprise mechanisms (not shown) for adjusting the pitch of the blade 140 to increase or reduce the amount of wind energy captured by the blade 140. Pitching adjusts the angle at which the wind strikes the blade 140. In certain embodiments, however, the pitching mechanisms may be omitted and, consequently, the pitch of the blades 140 cannot be adjusted in such embodiments.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the WTG 100 shown in FIG. 1 has three blades 140, it should be noted that a WTG may have a different number of blades. It is common to find WTGs having two to four blades. The WTG 100 shown in FIG. 1 is a Horizontal Axis Wind Turbine (HAWT) as the rotor 130 rotates about a horizontal axis. It should be noted that the rotor 130 may rotate about a vertical axis. Such a WTG having its rotor rotate about the vertical axis is known as a Vertical Axis Wind Turbine (VAWT). The WTG embodiments described henceforth are not limited to HAWTs having 3 blades. They may be implemented as both HAWTs and VAWTs, having any number of blades 140 in the rotor 130.

Located in the nacelle 120 are one or more controllers 160 used to control various aspects of the WTG 100 (also referred to herein as "the controller" for brevity). For example, the one or more controllers 160 receive data from the various sensors and controls aspects such as rotor speed, blade pitch angle, power output level, etc. Moreover, the one or more controllers 160 may include or have access to one or more memory devices in which are stored reference data, such as look-up-tables, climate and wind park model data, and the like. At least some of the one or more controllers 160 may also be located outside of the nacelle 120, such as in the tower 110 or in another structure near the WTG 100. The one or more controllers 160 may be implemented using circuitry that includes hardware, software encoded on computer-readable media including programmable and non-programmable media, or any combination of the foregoing.

Figure 2:
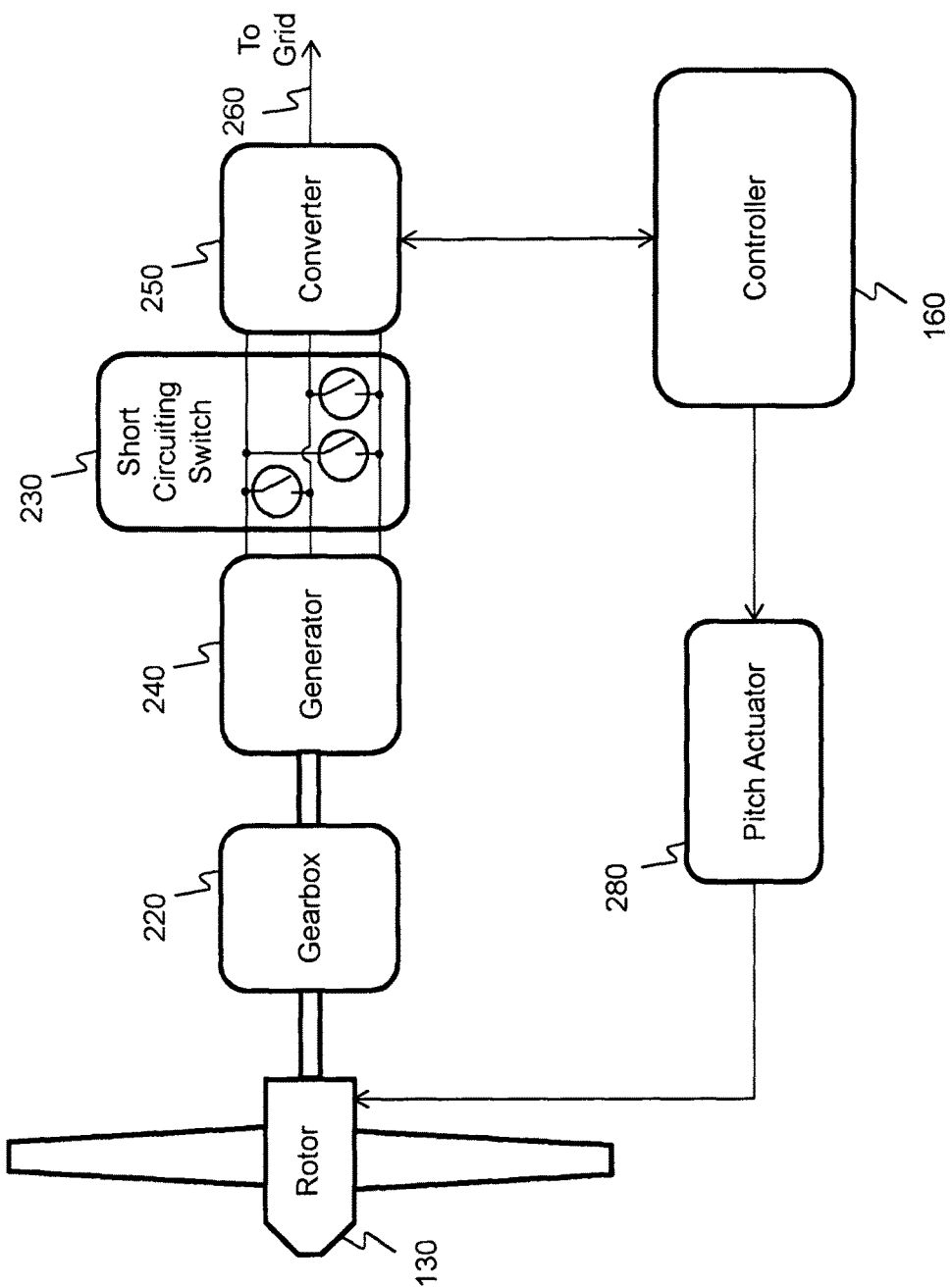
FIG. 2 shows a functional box diagram of the interior of a nacelle portion of the wind turbine in FIG. 1.

FIG. 2 is a schematic illustration showing components located in the interior of the nacelle 120 for the WTG shown in FIG. 1. The rotor 130 connects at the front of the nacelle 120 to a main low speed drive shaft, which is received in a gearbox 220. The gearbox 220 is, in turn, connected to an electrical generator 240 via a secondary high speed drive shaft. The generator 240 is a polyphase generator that receives a torque input from the rotor 130 and produces multi-phase electricity on multiple outputs, each output corresponding to a different phase. In normal operation, the electricity produced by the generator 240 is passed to an electrical power converter 250 and subsequently to an output 260 for connection to the grid or local utility. In the event of an unbalanced short circuit, however, a switch-point between the generator 240 and the converter 250 can create a balanced short circuit to reduce torque oscillations that would otherwise result from the unbalanced short circuit. The switch-point may be implemented as a short circuiting switch 230, as shown. In one example embodiment the generator 240 is a permanent magnet synchronous generator. However, other types of polyphase generators may be used instead. Moreover, in one embodiment, the converter 250 is a full-scale converter, but a converter that performs only a partial conversion of the generated power may instead be used.

The controller 160 of the WTG 100 determines and provides a pitch reference level to a pitch actuator 280 and determines and provides to the converter 250 a power reference level that designates a level of power to be produced by the generator 240. These reference levels are determined using internal control algorithms and/or tables in the controller 160.

The pitch reference value is the angle that the rotor blades are required to make with respect to the incident wind, and the value is adjusted to reflect changes in incident wind speed. The pitch angle of the blades affects the tip speed of the rotating turbine blades, and it is the role of the pitch actuator 202 to constantly control the blades according to the pitch angle received from the controller 160. The constant adjustment in the pitch angle rotor blades ensures that either optimal power is generated by the wind turbine or that when the wind speed is too high the wind turbine can be derated to enter a safe mode.

It should be noted that the illustration shown in FIG. 2 represents only one of many example embodiments that are contemplated. For example, in another example embodiment, the gearbox 220 may be omitted. Such embodiments are termed direct drive or gearless wind turbine embodiments. In addition, or alternatively, the generator 240 may be designed or controlled such that its output is at the frequency of the grid and the converter 250 may be omitted or replaced with another component that performs secondary functions, such as reactive power control and/or signal conditioning.

Figure 3:
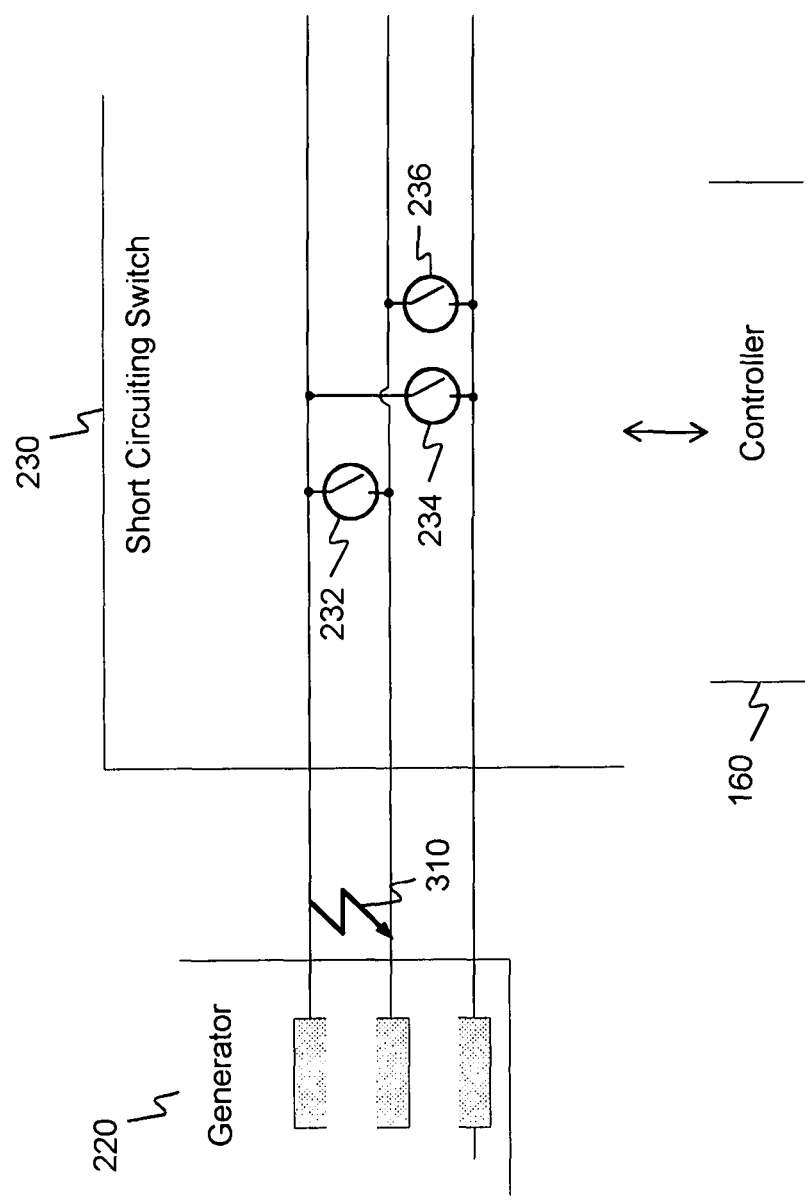
FIG. 3 shows a detailed view of a generator and short circuiting switch in the nacelle portion of the wind turbine at a first time.

FIG. 3 shows a detailed view of the generator 220 and the short circuiting switch 230 when a two-phase short circuit event occurs in the generator. (A two-phase short circuit event is merely one example of an unbalanced short circuit event that could be detected and mitigated. Other unbalanced short circuit events include a single-phase-to-ground short circuit event and a multiple-phase-to-ground short circuit event.) The controller 160 does not immediately identify a fault as balanced or unbalanced. Thus, FIG. 4 shows another detailed view of the generator 220 and converter 250 a moment later, after the fault has been identified as a two-phase short circuit event and the controller 160 has commanded the short-circuiting switch 230 to create a balanced short circuit in the generator.

Figure 4:
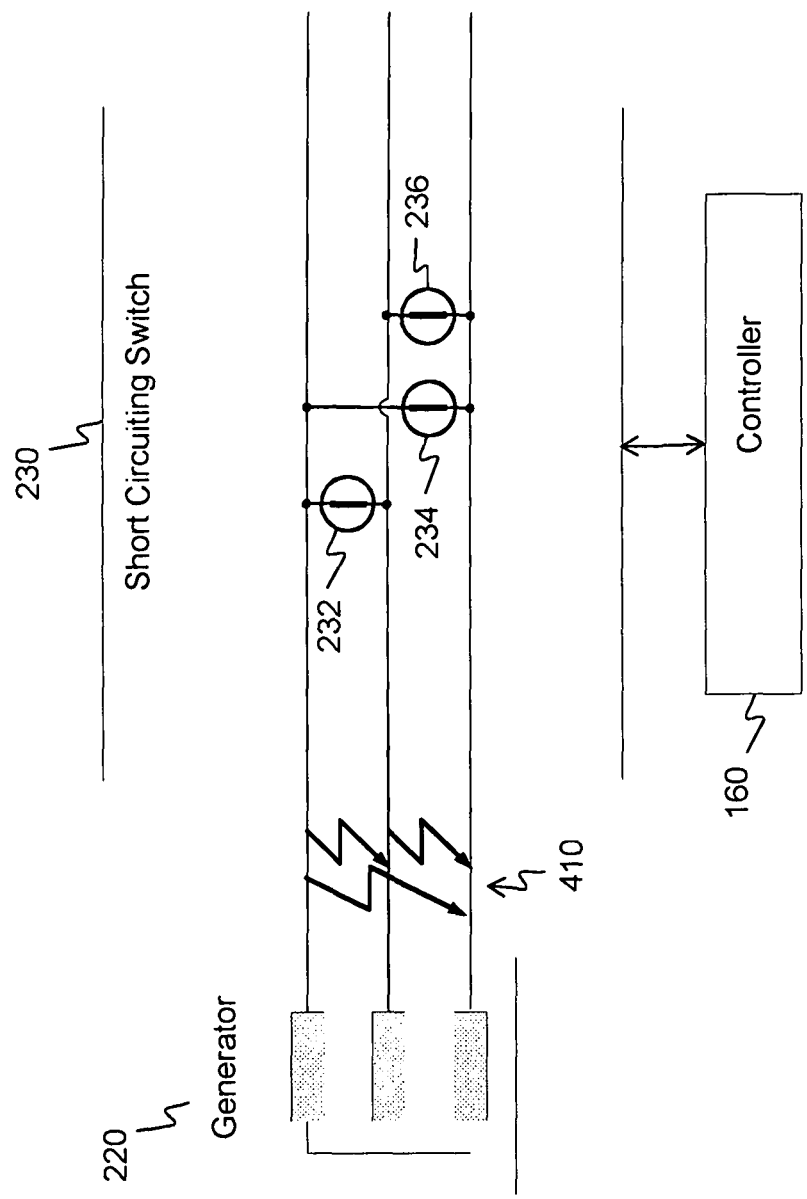
FIG. 4 shows a detailed view of the generator and short circuiting switch at a second time.

In the example embodiment shown in FIGS. 3 and 4, the short circuiting switch 230 includes a plurality of switches 232, 234, and 236. The switches 232, 234, and 236 may include thyristor switches, such as integrated gate-commutated thyristor (IGCT) switches and/or may include other switches of a type that is rated for high power. Each of the switches is coupled between a different pair of phase legs of the generator 220 to selectively short the phase legs and create a balanced short circuit in the generator. In one embodiment each of the switches 232, 234, 236 is individually controllable so that, if desired, only one (or only two) of the switches is (are) closed while the others remain open, while in other embodiments the switches are switched on and off simultaneously, e.g., by a single throw. Moreover, since only two switches are needed to short the set of three outputs together one of the switches 232, 234, 236 may be omitted in certain embodiments. However, to ensure reduction of transient currents three switches, as shown, may be used instead. Furthermore, in the example embodiment shown, the generator 220 is a three-phase generator with three output conductors, each output conductor carrying an electric power signal with a different phase than the others. However, other embodiments are contemplated, such as a generator with more than three phases and, in such embodiments, the short circuiting switch 230 may have a correspondingly higher number of switches.

Figure 7:
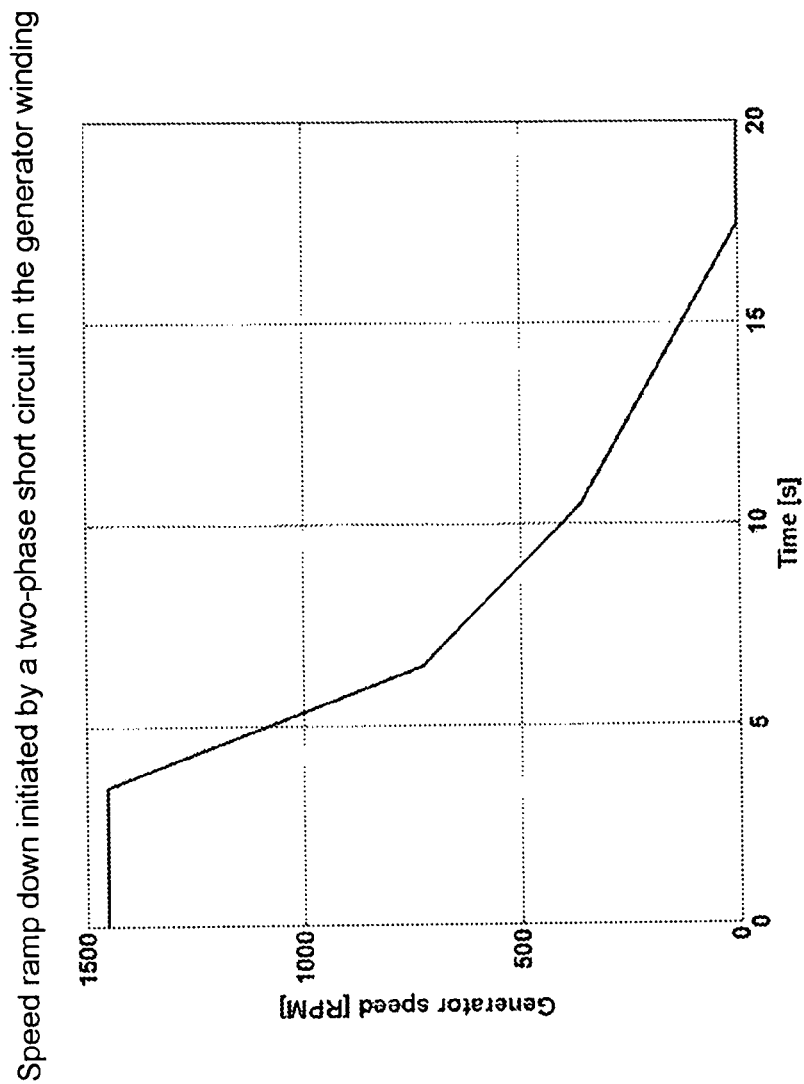
FIG. 7 shows an example speed ramp down profile when a two-phase short circuit event occurs.
Figure 8:
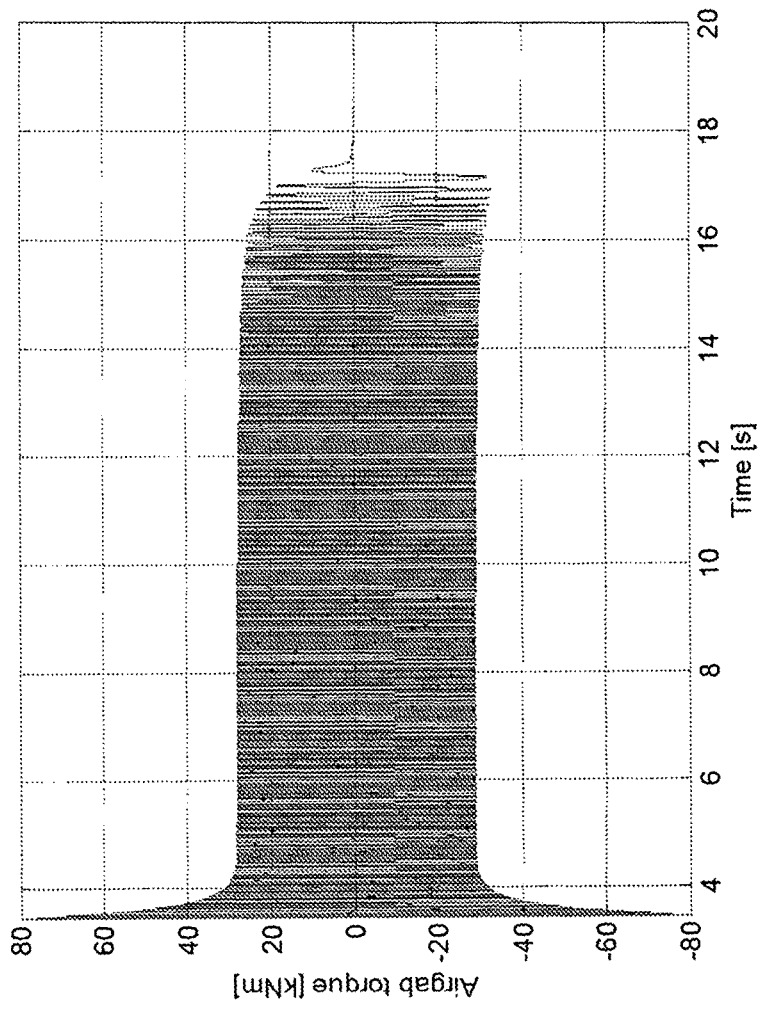
FIG. 8 shows an example torque response of the generator when a dump load is applied during the speed ramp down profile of FIG. 7.
Figure 9:
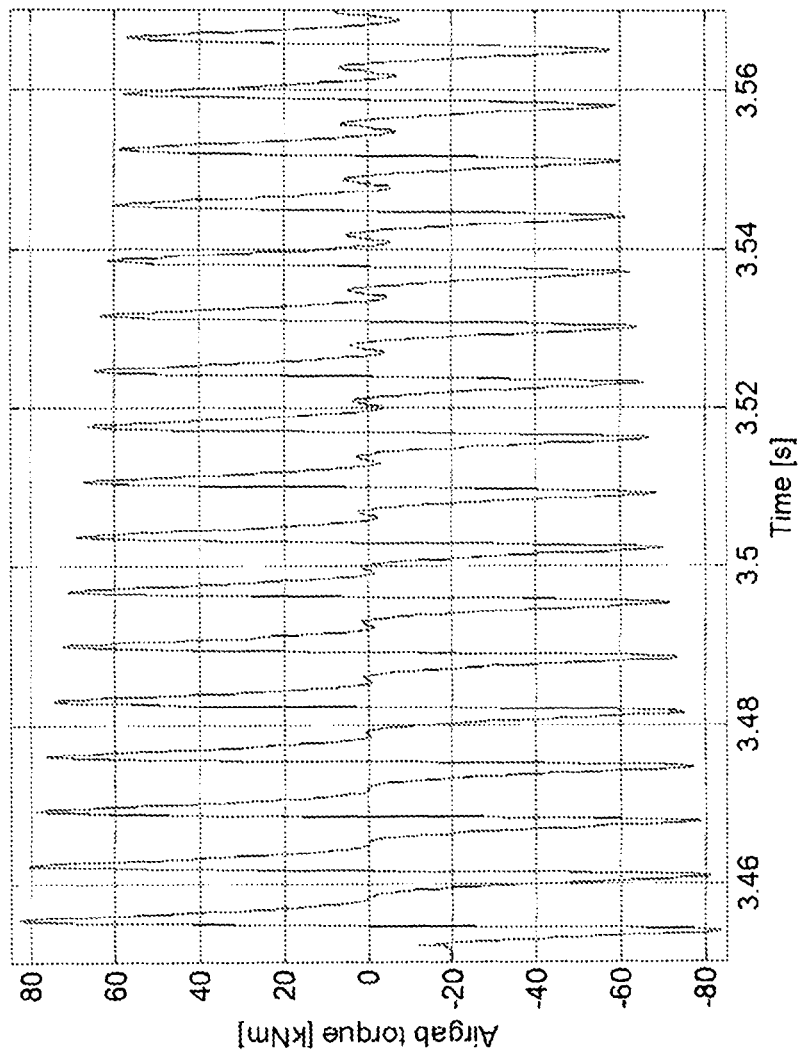
FIG. 9 shows a first zoomed in view of the graph shown in FIG. 8.
Figure 10:
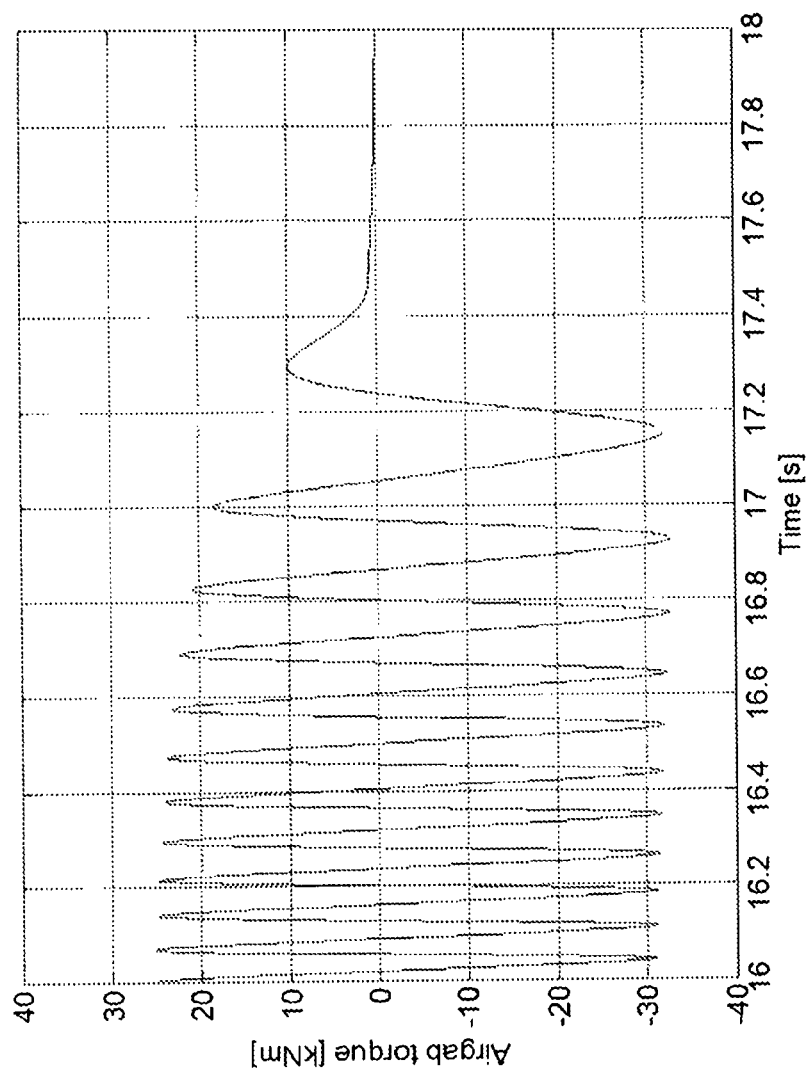
FIG. 10 shows a second zoomed in view of the graph shown in FIG. 8.
Figure 11:
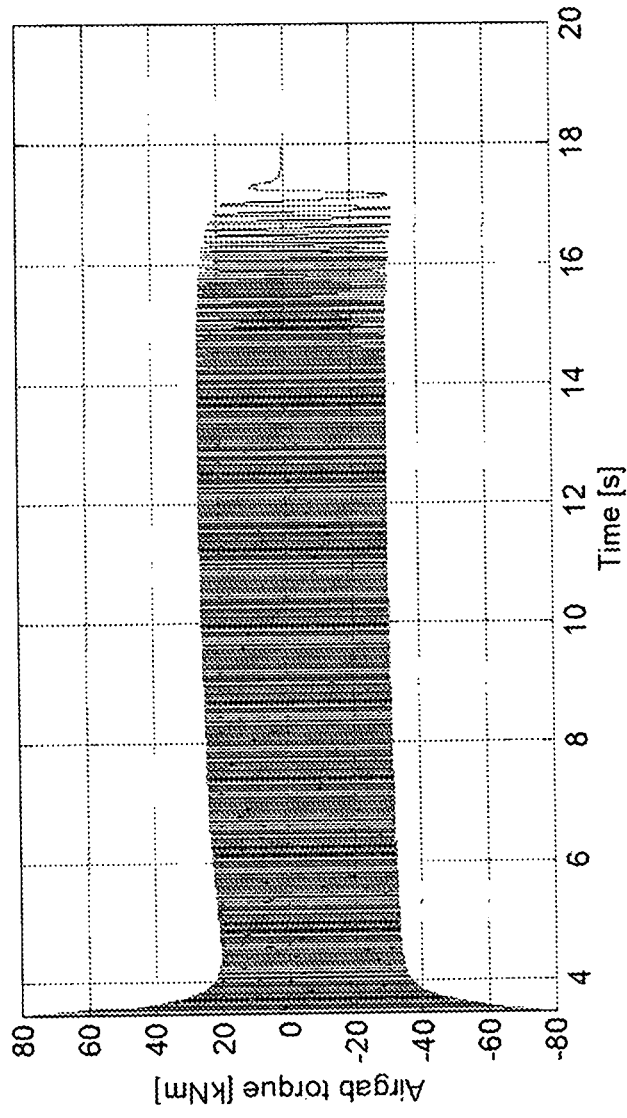
FIG. 11 shows an example torque response of the generator when a dump load is not applied during the speed ramp down profile of FIG. 7.
Figure 12:
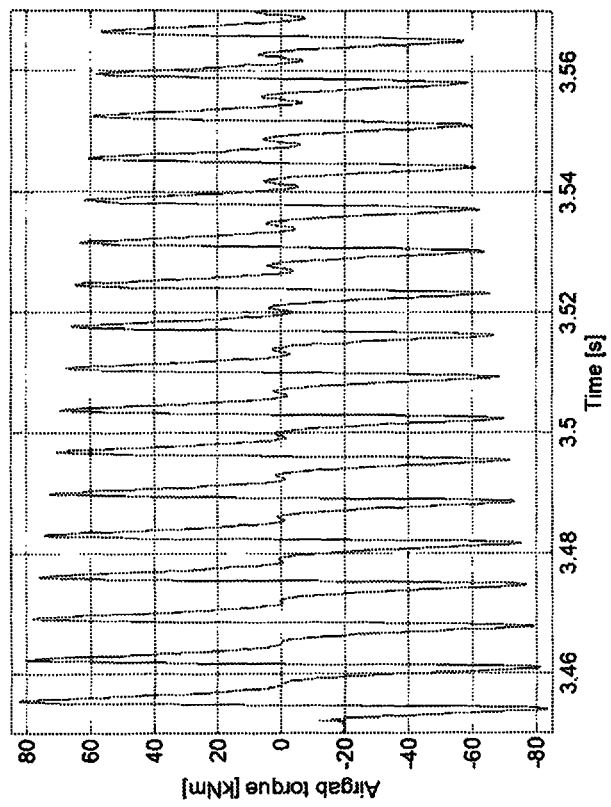
FIG. 12 shows a first zoomed in view of the graph shown in FIG. 11.
Figure 13:
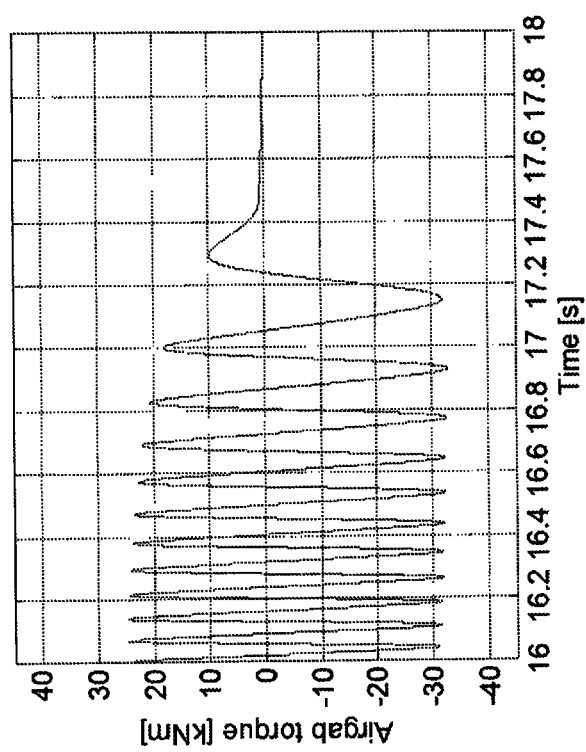
FIG. 13 shows a second zoomed in view of the graph shown in FIG. 11.

When an unbalanced short circuit occurs, as graphically represented by the arrow 310, the controller 160 will initially identify the unbalanced short circuit as a general voltage fault (e.g., by means of sensors coupled to sense voltage levels on the grid), without identifying whether the fault has occurred on the grid, in the generator, or elsewhere. The controller 160 will immediately (e.g., about 120 ms after the fault occurred) initiate a wind turbine shut down, e.g., by causing the converter 250 to disconnect from the grid, applying a dump load, causing the blades 140 of the rotor 130 to pitch out, and taking any other steps that facilitate a shutdown of the wind turbine 100. As a consequence, the generator speed will generally follow a speed ramp profile such as the one shown in FIG. 7.

Figure 5:
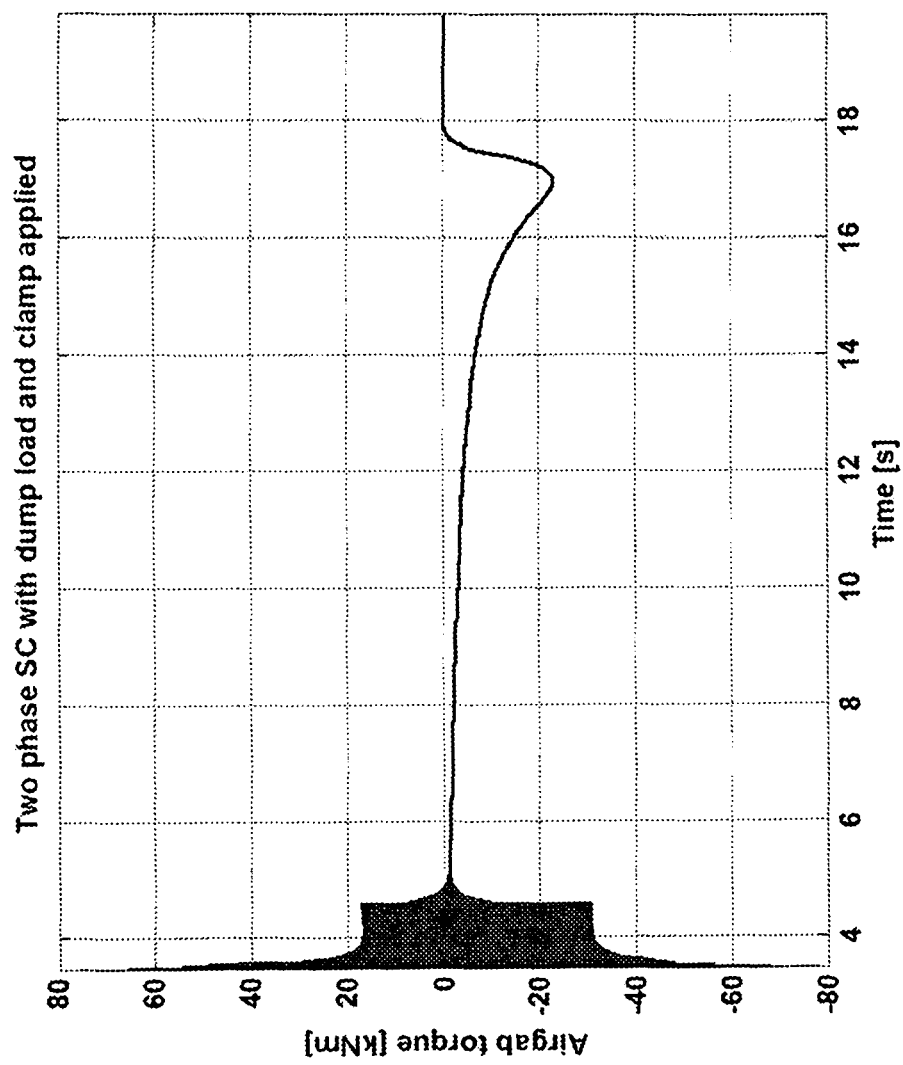
FIG. 5 shows a graph illustrating the torque response of the generator after an unbalanced short circuit event, according to one embodiment of the invention.

At a second time shown in FIG. 4 (e.g., about 1 second after the wind turbine initiates shut down), the controller 160 identifies that the fault is a two-phase short circuit and shorts at least one phase of the generator to create a balanced short circuit (graphically represented in FIG. 4 by the arrow 410) in the generator. The balanced short circuit causes at least some current produced by the generator 220 to bypass the dump load, which is within or coupled directly or indirectly to the converter 250. The balanced short circuit may be created by switching on one or more of the switches 232, 234, 236 in the short circuiting switch 230. As a result of the balanced short circuit created through the short circuiting switch 230, the torque response of the generator 220 becomes the same as a normal three-phase short circuit torque response and high amplitude torque oscillations associated with the two-phase short circuit event are prevented. FIG. 5 shows a torque response of the generator 220 as a result of the three-phase short circuit clamping procedure described above.

The controller 160 may identify the fault as an unbalanced short circuit in various ways. For example, a substantial imbalance in current flow through the dump load and/or voltage levels on the DC link may be used to indicate that an unbalanced short circuit event has likely occurred. Such conditions may be detected using voltage and/or current sensors (not shown) that monitor the outputs of the generator 220. In addition, a generator speed sensor and accelerometers on the wind turbine may also provide information that is indicative of an unbalanced short circuit.

In one embodiment, the balanced short circuit is created immediately upon detection of the unbalanced short circuit to avoid any possible damage due to torque oscillations. However, in another embodiment, the balanced short circuit is created gradually.

The gradual transition to a balanced short circuit is performed by, e.g., switching on and off the switches in the short circuiting switch 230 repeatedly in rapid succession (e.g., at a frequency of up to 2 kHz) for a brief period of time (e.g., 0.1 seconds up to 10 seconds). Moreover, to make the transition to a balanced short circuit gradual and with a controlled limit of short-circuit power draw, an adjustable on/off duty cycle can be used in which the on portion of the duty cycle (i.e., the portion that causes a short circuiting switch to close) is initially much shorter than the off portion and gradually changes over a period of time (e.g., 0.1 seconds up to 10 seconds) to become much longer than the off portion. The duty cycle is adjusted to ensure gradual transition from unbalanced short circuit to balanced 3-phase short circuit and also to avoid exceeding a safe operating area of the switches in the short circuiting switch 230. To facilitate the gradual transition to a balanced short circuit (or for other reasons) the switches 232, 234, and 236 used in the short-circuiting switch 230 may be of a type that facilitate high-speed switching. For example, one or more of the switches 232, 234, and 236 may be insulated-gate bipolar transistor (IGBT) switches or some other gate-activated type of switch.

Figure 6:
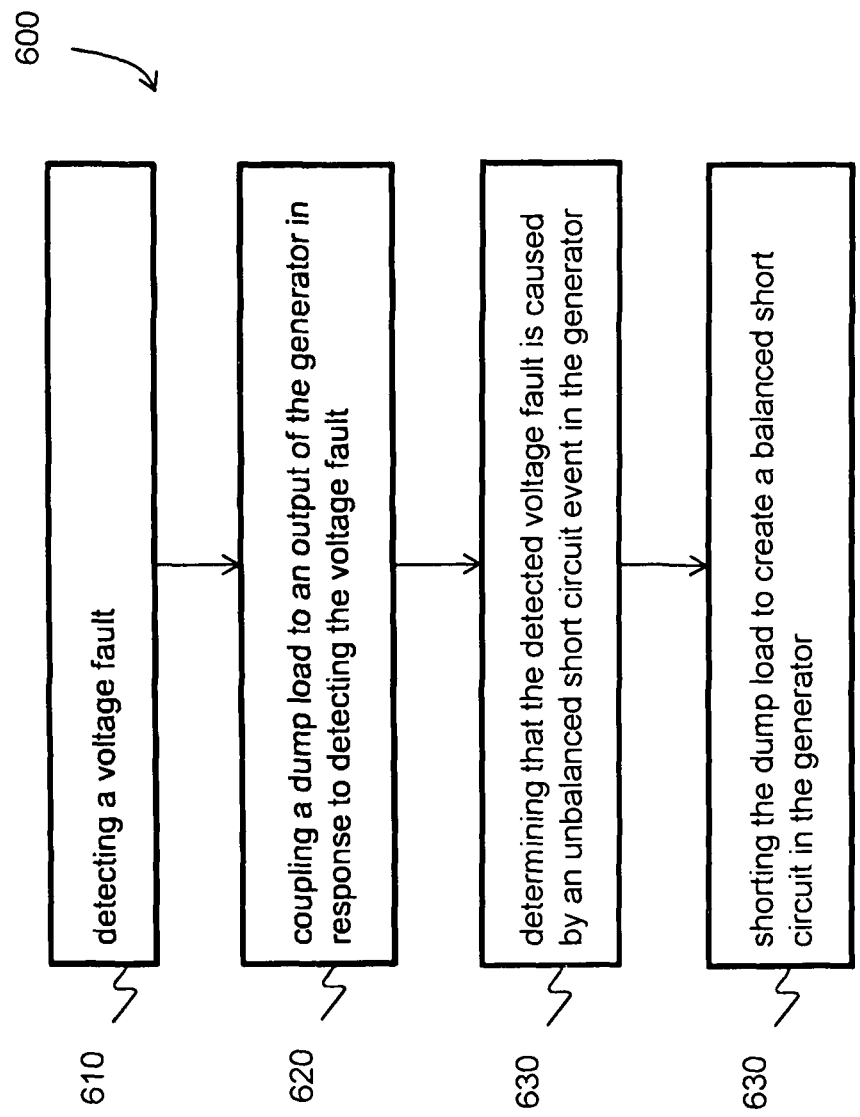
FIG. 6 shows a flow diagram representing an example method for reducing an impact of the unbalanced short circuit event in the generator.

FIG. 6 shows an example method 600 for controlling a wind turbine, such as the wind turbine 100. The method 600 includes a first stage 610 in which a voltage fault is detected. In the example wind turbine 100 described above, the controller 160 may carry out stage 610 in conjunction with sensors (not shown) that detect voltage levels at an output of the wind turbine 100. Next, at stage 620, a dump load is coupled to an output of the generator in response to detecting the voltage fault. For example, in the wind turbine 100, the controller 160 may cause a switch to close in the converter 250 to divert current to the dump load in response to the voltage fault detection. At the next stage, stage 630, the detected voltage fault is determined to be caused by an unbalanced short circuit event in the generator. The detected unbalanced short circuit event may be a two-phase short circuit event, a single-phase-to-ground short circuit event, or a multiple-phase-to-ground short circuit event. In the wind turbine 100, the controller 160 may determine the voltage fault is caused by an unbalanced short circuit by, e.g., taking readings from a current sensor coupled to the dump load and determining that current levels through the dump load 320 are imbalanced.

At the final stage shown, stage 640, the dump load is shorted to create a balanced short circuit in the generator. For example, the controller 160 may cause the short circuiting switch 230 to short at least one phase of the generator 220. In one example embodiment, this may be accomplished by causing the short circuiting switch 230 to short a circuit path between the at least one phase and at least one other phase on the generator outputs. Moreover, the balanced short circuit may be created gradually by, e.g., applying and removing a short between each phase leg of the short circuiting switch 230 repeatedly in rapid succession and, optionally, using an adjustable on/off duty cycle that transitions from mostly off (open circuit) to mostly on (short circuit).

The foregoing method 600 is just one example method that is contemplated. In fact, in other example methods, certain stages of the method 600 may be omitted or replaced with other stages. In addition or alternatively, additional stages may be added to the example method 600. For example, additional stages associated with blade pitch control may be performed in response to detecting a voltage fault.

As demonstrated above, example methods and systems described herein may be used to reduce the impact of an unbalanced short circuit in a generator of a wind turbine to be no worse than the impact of a balanced short circuit in the generator. It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A method of reducing an impact of an unbalanced short circuit event in a wind turbine, wherein the wind turbine comprises a polyphase permanent magnet generator comprising a plurality of phase legs, and wherein the wind turbine further comprises a converter that converts electric power produced by the generator for use in a power grid, the method comprising:
    detecting an unbalanced short circuit event in the generator of the wind turbine; and
    in response to detecting the unbalanced short circuit event, shorting at least one of the plurality of phase legs of the generator at a switch-point between the generator and the converter to create a balanced short circuit in the generator, wherein the switch-point comprises a plurality of switches, each of which is coupled between a different pair of the plurality of phase legs of the generator, and wherein shorting the at least one of the plurality of phase legs of the generator comprises selectively controlling at least one of the plurality of switches.

2. The method according to claim 1, wherein the detected unbalanced short circuit event is at least one of a two-phase short circuit event, a single-phase-to-ground short circuit event, and a multiple-phase-to-ground short circuit event.

3. The method according to claim 1, further comprising:
    detecting a voltage fault; and
    coupling a dump load to an output of the generator in response to detecting the voltage fault,
    wherein detecting the unbalanced short circuit comprises determining that the detected voltage fault is caused by the unbalanced short circuit event in the generator, and
    wherein shorting the at least one of the plurality of phase legs of the generator comprises shorting the dump load.

4. The method according to claim 1, wherein shorting the at least one of the plurality of phase legs of the generator comprises shorting a circuit path at the switch-point between the at least one phase leg and at least one other phase leg of the plurality of phase legs.

5. The method according to claim 1, wherein shorting the at least one of the plurality of phase legs of the generator to create the balanced short circuit is performed gradually by applying and removing the short repeatedly in rapid succession.

6. A wind turbine with unbalanced short circuit protection, the wind turbine comprising:
    a rotor comprising one or more blades configured to cause the rotor to rotate in response to wind forces;
    a polyphase permanent magnet generator comprising a plurality of phase legs and configured to receive a torque input from the rotor and to produce multi-phase electric power;
    a converter configured to receive the electric power produced by the generator and to convert the electric power for use in a power grid;
    a short circuiting switch arranged between the generator and the converter and configured to create a balanced short circuit in the generator when enabled, wherein the short circuiting switch comprises a plurality of switches, and wherein each of the plurality of switches is coupled between a different pair of the plurality of phase legs of the generator;
    one or more sensors configured to provide information indicative of an unbalanced short circuit event; and
    a controller configured to receive data from the one or more sensors to detect the unbalanced short circuit event and, in response to detecting the unbalanced short circuit, the controller is further configured to cause at least one of the plurality of switches of the short circuiting switch to short at least one of the phase legs to create a balanced short circuit in the generator.

7. The wind turbine according to claim 6, wherein the detected unbalanced short circuit event is at least one of a two-phase short circuit event, a single-phase-to-ground short circuit event, and a multiple-phase-to-ground short circuit event.

8. The wind turbine according to claim 6, further comprising:
    a dump load configured to be selectively coupled to the generator to consume the electricity produced by the generator when a fault occurs,
    wherein the controller is further configured to:
        detect a voltage fault and couple the dump load to the generator in response to detecting the voltage fault; and
        determine that the detected voltage fault is caused by the unbalanced short circuit event,
    wherein the balanced short circuit created by the short circuiting switch causes a short across the dump load.

* * * * *